US007497408B2

(12) United States Patent
Lim et al.

(10) Patent No.: US 7,497,408 B2
(45) Date of Patent: Mar. 3, 2009

(54) MONITOR APPARATUS

(75) Inventors: Jeong-su Lim, Suwon (KR);
Sang-kyeong Ha, Suwon (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 46 days.

(21) Appl. No.: 10/812,011

(22) Filed: Mar. 30, 2004

(65) Prior Publication Data

US 2004/0203282 A1    Oct. 14, 2004

(30) Foreign Application Priority Data

Apr. 9, 2003  (KR) .................... 10-2003-0022444

(51) Int. Cl.
*E04G 3/00* (2006.01)
(52) U.S. Cl. .............................. 248/284.1; 248/123.11; 248/281.11; 248/280.11; 248/292.11; 248/292.13; 248/371; 361/681
(58) Field of Classification Search .............. 248/284.1, 248/121, 125.2, 123.11, 125.9, 281.11, 280.11, 248/292.11, 292.13, 297.11, 371, 372, 917, 248/918–924, 372.1, 274.1, 133, 138, 149; D14/371; 361/681, 682, 683, 825
See application file for complete search history.

(56) References Cited

U.S. PATENT DOCUMENTS

| 4,834,329 | A | * | 5/1989 | Delapp ..................... 248/183.3 |
| 5,812,368 | A | * | 9/1998 | Chen et al. .................. 361/681 |
| 6,532,628 | B2 | * | 3/2003 | Kim ............................ 16/342 |

(Continued)

FOREIGN PATENT DOCUMENTS

JP    11-74652    3/1999

| JP | 2001-51750 A | 2/2001 |
| KR | 1999-75223 | 10/1999 |

(Continued)

OTHER PUBLICATIONS

Applicants Admitted Prior Art (AAPA) as identified by Figures 1-2b of the drawings, and pp. 1-2 of specification, which the applicant submitted.*

(Continued)

*Primary Examiner*—J. Allen Shriver
*Assistant Examiner*—Todd M. Epps
(74) *Attorney, Agent, or Firm*—Staas & Halsey LLP

(57) ABSTRACT

A monitor apparatus including a monitor and a base to support the monitor. The monitor apparatus further includes a first link provided between the monitor and the base; a second link provided between the monitor and the base adjacent to the first link; a base bracket combined to the base having first and second lower supporting parts to rotatably support lower parts of the first and second links, respectively; a connecting bracket rotatably combined to the monitor having first and second upper supporters to rotatably support upper parts of the first and second links, respectively. A first spring is interposed between the first link and the first lower supporting part to elastically bias the first link upward with respect to the base; and a second spring is interposed between the second link and the second lower supporting part to elastically bias the second link upward with respect to the base, where the distance between rotating axes of the first and second lower supporting parts, on which the first and second links are rotatably supported, respectively, is greater than the distance between tilting axes of the first and second upper supporters. Accordingly, the present invention provides a monitor apparatus in which a monitor can be adjusted in both height and a tilting angle as desired, where the height of the monitor is adjusted while keeping the tilting angle thereof in an angle suitable for a user to view the screen.

34 Claims, 12 Drawing Sheets

U.S. PATENT DOCUMENTS

| | | | |
|---|---|---|---|
| 6,570,627 B1* | 5/2003 | Chang | 348/794 |
| 6,671,928 B2* | 1/2004 | Huang | 16/340 |
| 6,695,274 B1* | 2/2004 | Chiu | 248/371 |
| 6,822,857 B2* | 11/2004 | Jung et al. | 361/681 |
| 7,061,753 B2* | 6/2006 | Michoux et al. | 361/681 |
| 7,177,144 B2* | 2/2007 | Ha et al. | 361/681 |
| 7,198,237 B2* | 4/2007 | Cho et al. | 248/133 |
| 7,252,277 B2* | 8/2007 | Sweere et al. | 248/371 |
| 2004/0012917 A1* | 1/2004 | Jung et al. | 361/681 |
| 2004/0211866 A1* | 10/2004 | Jung et al. | 248/133 |

FOREIGN PATENT DOCUMENTS

| | | |
|---|---|---|
| KR | 2001-108910 | 12/2001 |
| KR | 20-290788 | 9/2002 |
| KR | 20-295560 | 11/2002 |
| KR | 20-295981 | 11/2002 |
| KR | 20-305308 | 2/2003 |

OTHER PUBLICATIONS

Applicants Admitted Prior Act (AAPA) as identified by Figures 1-2b of the drawings, and pp. 1-2 of specification, which the applicant submitted on Mar. 30, 2004.*

* cited by examiner

MONITOR APPARATUS

CROSS-REFERENCE TO RELATED APPLICATIONS

This application claims the benefit of Korean Patent Application No. 2003-22444, filed Apr. 9, 2003, in the Korean Intellectual Property Office, the disclosure of which is incorporated herein by reference.

BACKGROUND OF THE INVENTION

1. Field of the Invention

The present invention relates to a monitor apparatus, more particularly, to a monitor apparatus having an improved structure to rotate a monitor relative to a base.

2. Description of the Related Art

As shown in FIG. 1, a conventional monitor apparatus comprises a base 101 seated on a predetermined plane, a monitor 102 to display a picture thereon, a connecting member 110 to connect the base 101 to the monitor apparatus 102, and a spring member 160 to elastically bias the connecting member 110 upward with respect to the base 101.

The connecting member 110 has a lower part rotatably connected to a pair of base brackets 104 and 106 that are combined to the base 101, and an upper part incorporated with the monitor 102.

The spring member 160 has resilience elastically biasing the connecting member 110 upward with respect to the base 101 that corresponds to the weight of the monitor 102.

Thus, the connecting member 110 can be tilted up and down with respect to the base 101 as shown with an arrow "A" in FIG. 1, however, the monitor 102 cannot be tilted with respect to the connecting member 110.

As shown in FIGS. 2A and 2B, according to the conventional monitor apparatus, it is impossible to change a tilting angle between the monitor 102 and the connecting member 110. Therefore, when the connecting member 110 is tilted towards the base 101, the distance between the monitor 102 and the base 101 is adjusted as shown in FIG. 2B, making it inconvenient for a user to view a screen of the monitor apparatus.

In contrast, a monitor apparatus (not shown) has been provided according to which the connecting member has the upper part rotatably connected to the monitor, and has the lower part incorporated with the base. Accordingly, even though the angle between the monitor and the connecting member can be varied, it is impossible to adjust the height of the monitor with respect to the base 101.

Recently, various sizes of monitors have been provided to satisfy consumer demands. However, the conventional monitor apparatus has inflexible structure that does not allow the monitor apparatus to be used with different monitor sizes, thus, it is impossible for the conventional monitor apparatus to effectively accommodate various monitor sizes.

SUMMARY OF THE INVENTION

Accordingly, it is an aspect of the present invention to provide a monitor apparatus of a monitor adjustable in height and tilting angle as desired, so that the monitor can be adjusted in the tilting angle suitable for a user to easily view a screen of the monitor when the height of the monitor is varied.

It is another aspect of the present invention to provide a monitor apparatus, which can accommodate various monitor sizes.

The foregoing and/or other aspects of the present invention are achieved by providing a monitor apparatus comprising: a monitor, and a base to support the monitor. The monitor apparatus further comprises: a first link provided between the monitor and the base; a second link provided between the monitor and the base adjacent to the first link; a base bracket, combined to the base, the base bracket having first and second lower supporting parts to rotatably support lower parts of the first and second links, respectively; a connecting bracket rotatably combined to the monitor, and having first and second upper supporters to rotatably support upper parts of the first and second links, respectively. Further, a first spring is interposed between the first link and the first lower supporting part to elastically bias the first link upward with respect to the base; a second spring is interposed between the second link and the second lower supporting part to elastically bias the second link upward with respect to the base, where the distance between rotating axes of the first and second lower supporting parts on which the first and second links are rotatably supported, respectively, is greater than the distance between tilting axes of the first and second upper supporters.

Additional aspects and advantages of the invention will be set forth in part in the description which follows and, in part, will be obvious from the description, or may be learned by practice of the invention.

According to an aspect of the invention, the connecting bracket includes a monitor coupler provided spaced from the first and second upper supporters, and rotatably combined to the monitor.

According to another aspect of the invention, the monitor apparatus further comprises a link rotation restrictive part to restrict a rotation angle of at least one of the first and second links relative to the base.

According to another aspect of the invention, the link rotation restrictive part comprises a protrusion protruding from the base bracket to restrict the rotation angle of at least one of the first and second links members by making contact with an upper surface of at least one of the first and second links members.

According to an aspect of the invention, the first spring includes a torsion spring, which has a first end coupled to a first lower supporting part, and a second end coupled to the first link.

According to an aspect of the invention, the second spring includes a torsion spring, which has a first end removably coupled to a second lower supporting part, and a second end removably coupled to a second link.

According to yet another aspect of the invention, the monitor apparatus further comprises a monitor bracket combined to the monitor, and rotatably combined to the connecting bracket.

According to an aspect of the invention, the monitor apparatus further comprises a monitor tilting restrictive part to restrict a tilting angle of the monitor bracket relative to the connecting bracket.

According to an aspect of the invention, the monitor tilting restrictive part comprises a projection protruding from the monitor coupler towards the connecting supporter of the monitor bracket, and a stopping part formed by cutting an arc of the connecting supporter provided in the monitor bracket.

BRIEF DESCRIPTION OF THE DRAWINGS

These and/or other aspects and advantages of the invention will become apparent and more readily appreciated from the following description of the embodiments, taken in conjunction with the accompany drawings of which.

DETAILED DESCRIPTION OF THE PREFERRED EMBODIMENTS

Figure 1:
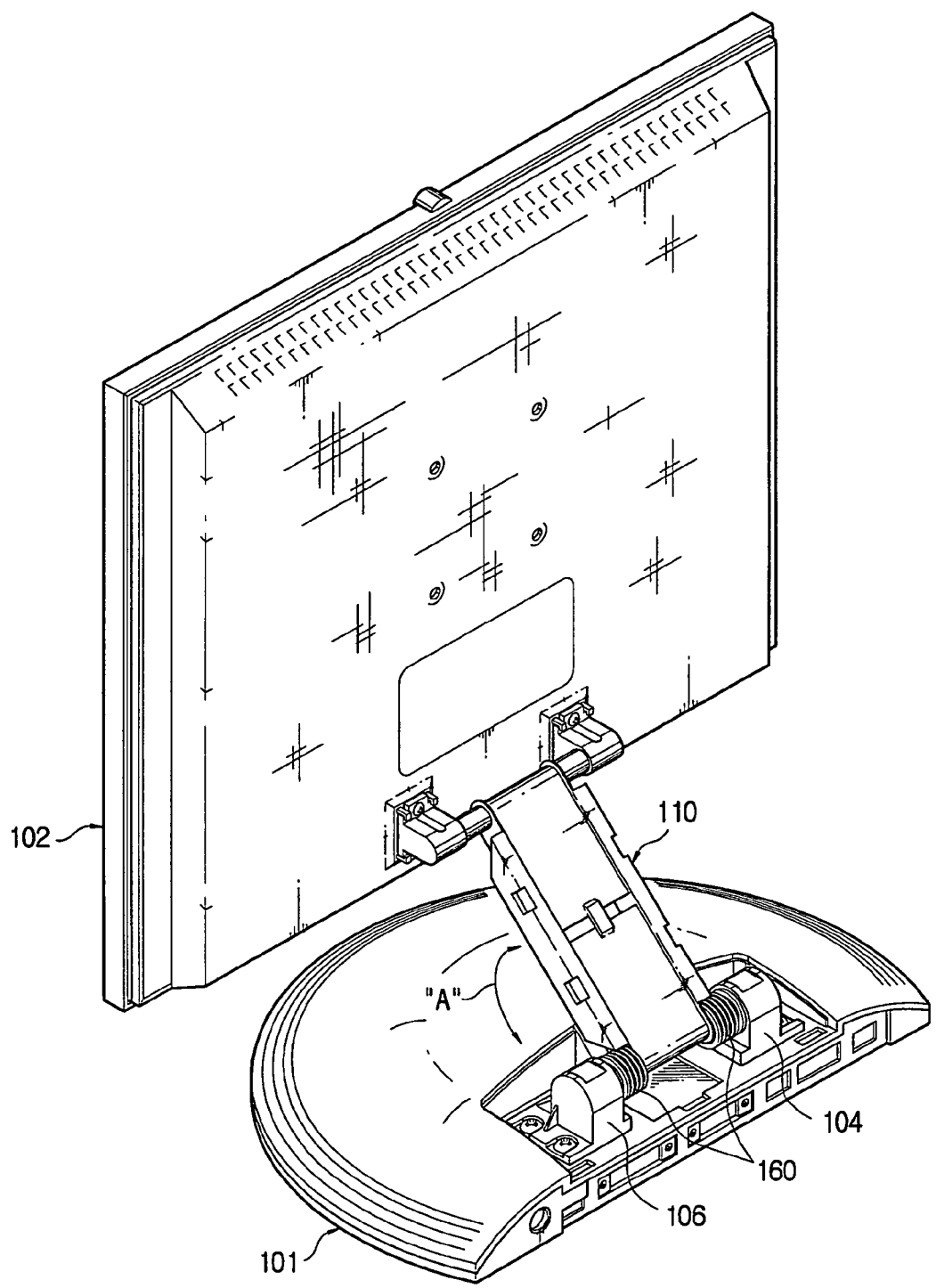
FIG. 1 is a rear perspective view of a conventional monitor apparatus.
Figure 2A:
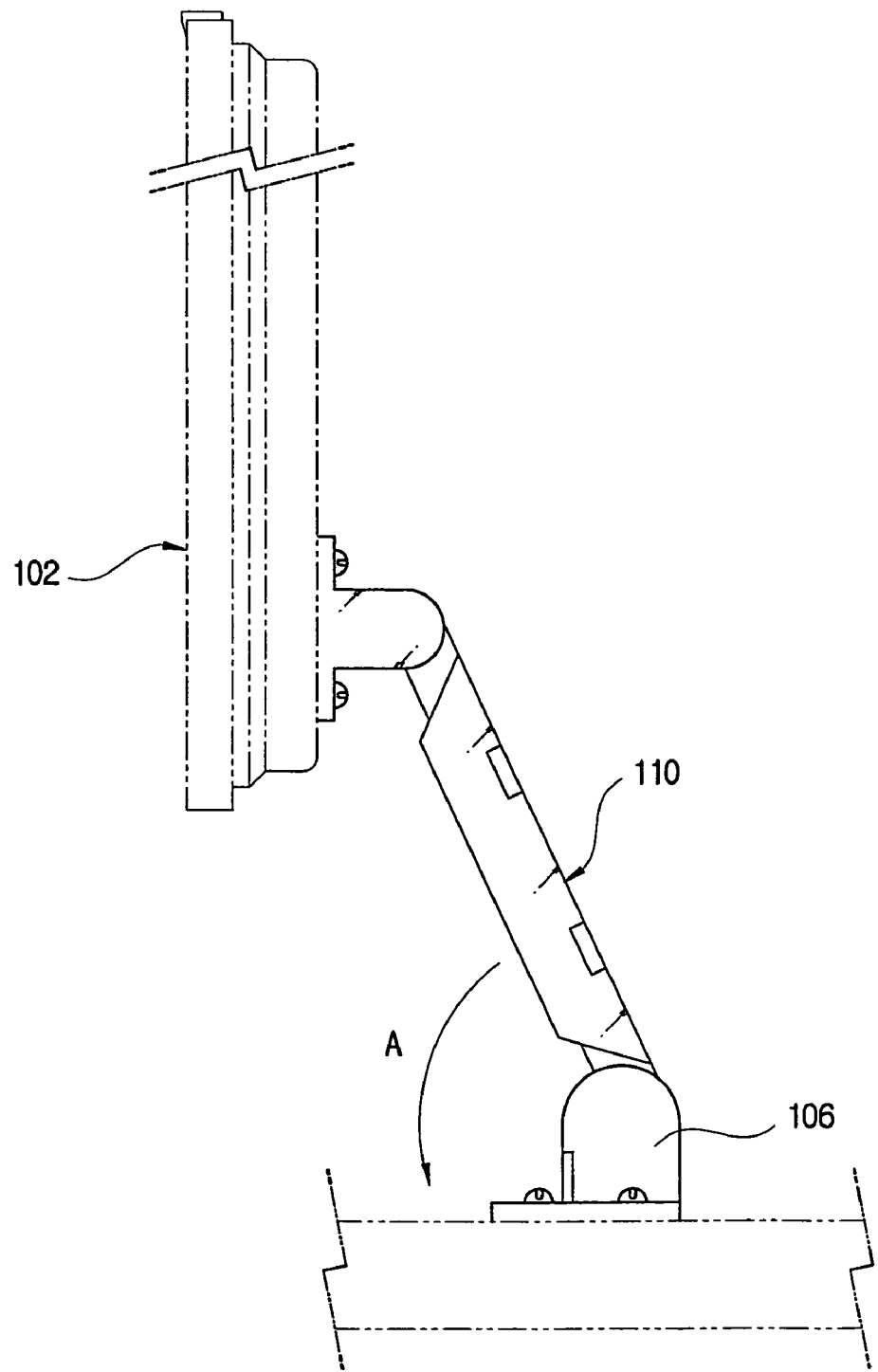
FIGS. 2A and 2B are side views of the conventional monitor apparatus.
Figure 2B:
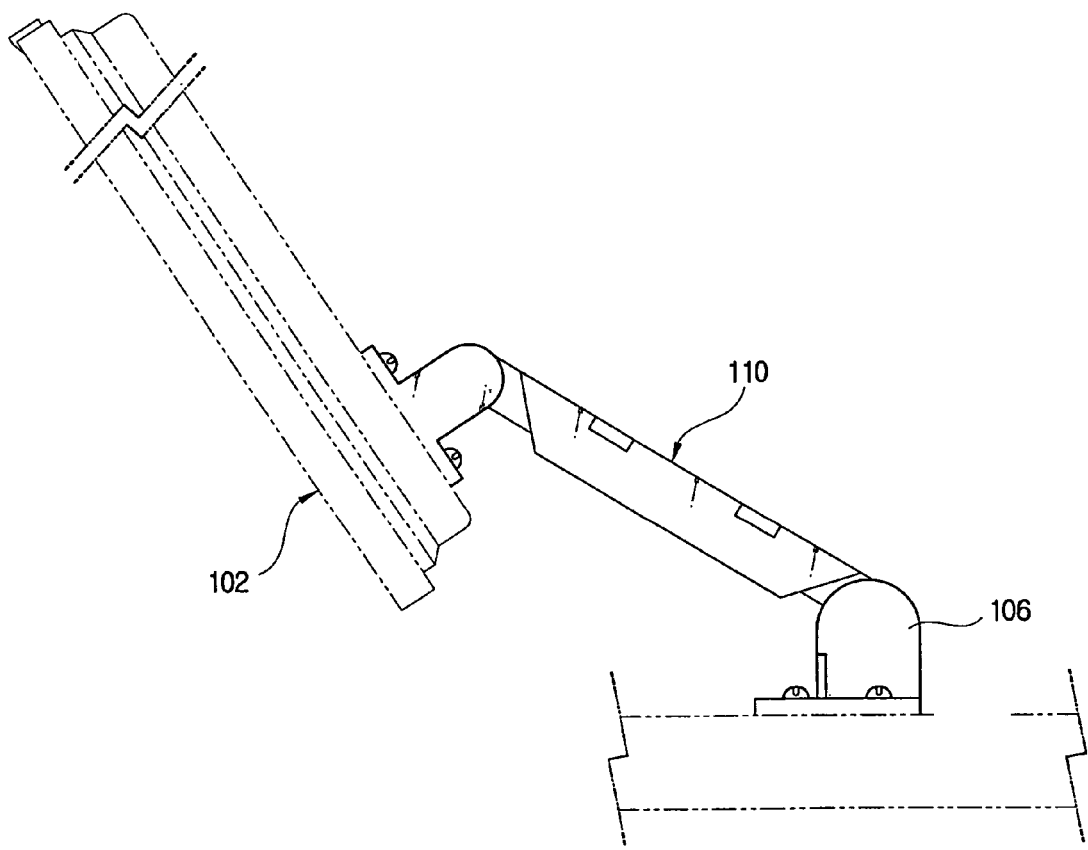

Reference will now be made in detail to the embodiments of the present invention, examples of which are illustrated in the accompanying drawings, wherein like reference numerals refer to the like elements throughout.

Figure 3:
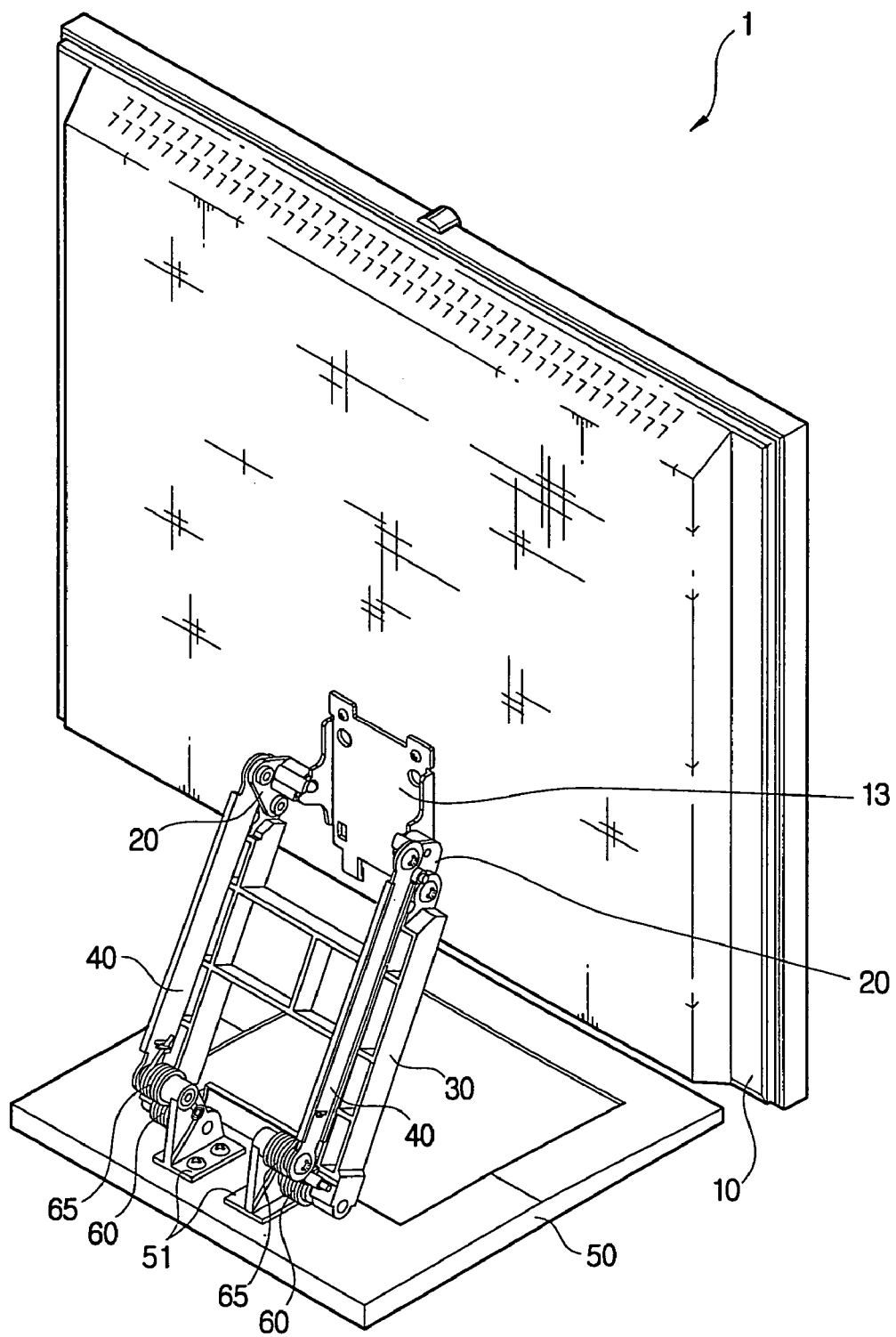
FIG. 3 is a rear perspective view of a monitor apparatus according to an aspect of the present invention.
Figure 4:
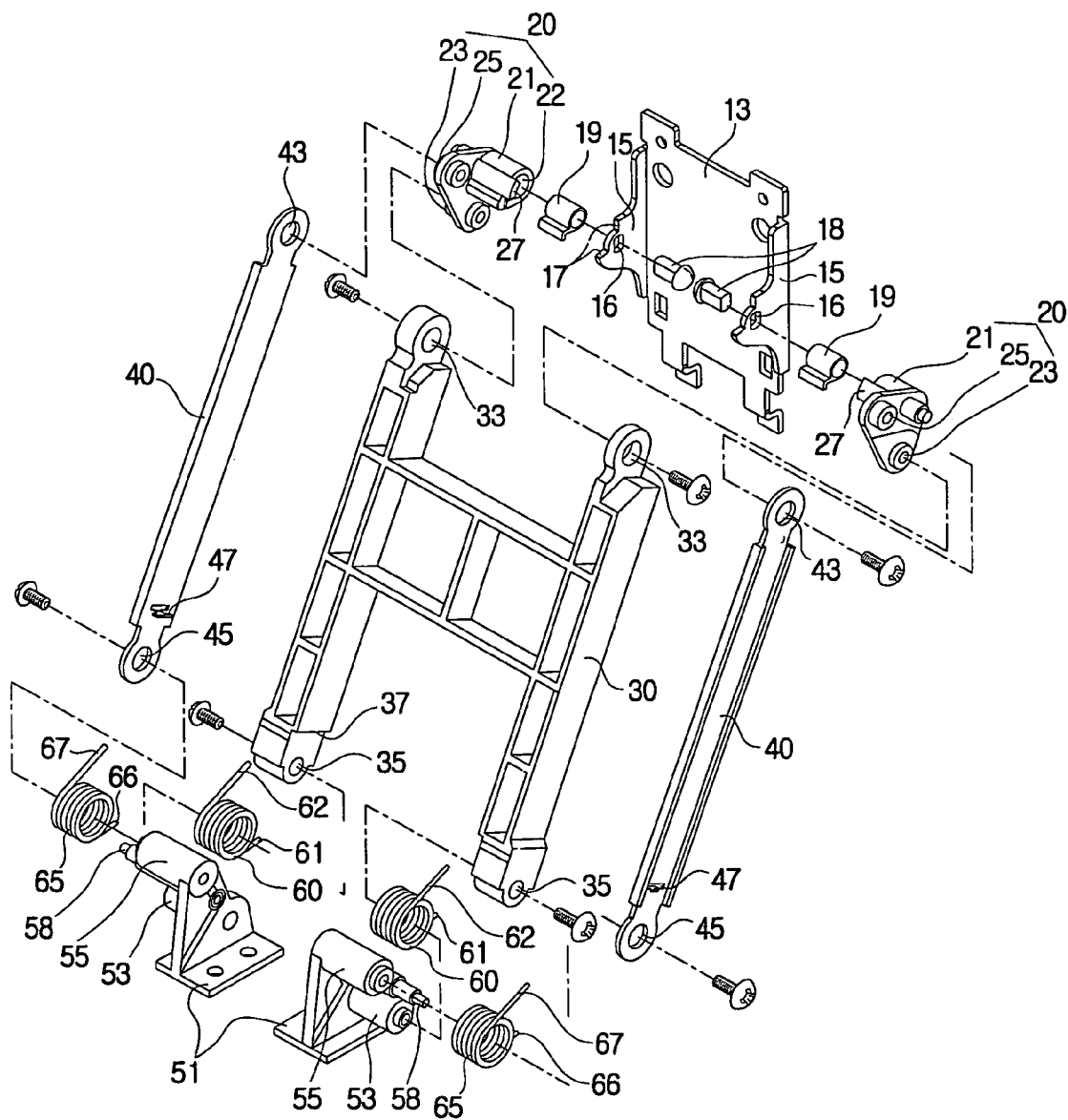
FIG. 4 is an exploded perspective view of the monitor apparatus of FIG. 3 according to an aspect of the present invention.

As shown in FIGS. 3 and 4, a monitor apparatus 1 according to an aspect of the present invention comprises: a base 50 seated on a predetermined plane, a monitor 10 having a screen on which a picture is displayed, a first link 30 provided between the base 50 and the monitor 10, a second link 40 provided adjacent to the first link 30 between the base 50 and the monitor 10, a base bracket 51 combined to the base 50 to rotatably support lower parts of the first and second links 30 and 40, and a connecting bracket 20 rotatably combined to the monitor 10 to rotatably support upper parts of the first and second links 30 and 40. The monitor apparatus further comprises: a first spring 60 interposed between the first link 30 and the base bracket 51 to elastically bias the first link 30 upward with respect to the base 50, and a second spring 65 interposed between the second link 40 and the base bracket 51 to elastically bias the second link 40 upward with respect to the base 50. Further, the monitor apparatus 1 according to an aspect of the present invention comprises a monitor bracket 13 having a first end combined to the monitor 10, and a second end rotatably combined to the connecting bracket 20.

The monitor 10 has a screen on which a picture is displayed, where the screen is made of an LCD (Liquid Crystal Display). However, the screen of the monitor may be made of various displays such as a PDP (Plasma Display Panel), etc.

The monitor bracket 13 is detachably combined to a back of the monitor 10 by screws or other similar elements and/or techniques, and includes a connecting supporter 15 protruding towards the connecting bracket 20.

The connecting supporter 15 forms a pair corresponding to monitor couplers 21 of the connecting bracket 20 (to be described later). Each connecting supporter 15 is formed with a through hole 16 to be rotatably combined to the monitor coupler 21 of the connecting bracket 20, and the through hole 16 has a noncircular shape so as to be rotated incorporatively with a shaft 18 (to be described later).

The connecting bracket 20 includes the monitor coupler 21 to rotatably combine with the monitor bracket 13, and first and second upper supporters 23 and 25 to rotatably combine with upper parts of the first and second links 30 and 40, respectively. The connecting bracket 20 forms a pair corresponding to the pair of connecting supporters 15 provided to the monitor bracket 13, and is moved/rotated by only the first and second links 30 and 40.

The monitor coupler 21 has a protruding part protruding from the connecting bracket 20, where the protruding part is formed with a shaft holder 22 in which the shaft 18 is accommodated, thereby, rotatably combining the monitor coupler 21 with the connecting supporter 15 of the monitor bracket 13. According to an aspect of the invention, the monitor coupler 21 is not aligned with the first or second upper supporters 23 or 25.

The shaft 18 has a noncircular cross-section to be inserted into the through hole 16 of the connecting supporter 15, so that the shaft 18 and the through hole 16 are incorporatively rotated. According to an aspect of the invention, the shaft 18 is fitted into the shaft holder 22 along with a flat spring 19.

Further, there is provided a monitor tilting restrictive part to restrict a tilting angle of the monitor bracket 13 relative to the connecting bracket 20.

The monitor tilting restrictive part comprises a projection 27 protruding from the monitor coupler 21 towards the connecting supporter 15 of the monitor bracket 13, and a stopping part 17 formed by cutting an arc off the connecting supporter 15 provided to the monitor bracket 13. Here, the angle of the arc of the stopping part 17 can vary in consideration of the tilting angle of the monitor 10 combined to the monitor bracket 13.

Thus, a user can tilt the monitor 10 at a predetermined angle with respect to the connecting bracket 20 with force to overcome rotation resistance of the shaft 18.

The first and second upper supporters 23 are provided apart from each other by a predetermined distance, and are rotatably combined to first and second upper couplers 33 and 43 of the first and second links 30 and 40 by a screw or similar techniques and/or elements, respectively.

The base 50 has a predetermined area large enough to support the monitor 10, and is combined to the pair of base brackets 51 provided apart from each other at a predetermined distance by a screw or similar techniques and/or elements.

The base bracket 51 forms a pair, and each base bracket 51 has a bottom part combined onto the base 50. Each base bracket 51 includes a first lower supporting part 53 rotatably combined to a lower part of the first link 30, and a second lower supporting part 55 rotatably combined to a lower part of the second link 40.

The first and second lower supporting parts 53 and 55 are provided apart from each other, and each have a protruding part protruding from the base bracket 51. To the protruding parts are rotatably combined lower parts of the first and second links 30 and 40 by a screw or similar elements and/or techniques.

The first link 30 has an "H"-shape, and includes a pair of first lower couplers 35, and a pair of first upper couplers 33.

The first lower couplers 35 are rotatably combined to the first lower supporting parts 53 of the base bracket 51 by a screw or similar elements and/or techniques, respectively. The first upper couplers 33 are rotatably combined to the first upper supporters 23 of the connecting bracket 20 by a screw or similar elements and/or techniques.

The second link 40 is shaped similar to a bar, and forms a pair. The second link 40 has a second lower coupler 45, and a second upper coupler 43. The second link 40 is provided adjacent to the first link 30, and the second link 40 is placed above the first link with respect to the base 50.

The second lower combing parts 45 are rotatably combined to the second lower supporting parts 55 by a screw or similar elements and/or techniques, respectively. The second upper couplers 43 are rotatably combined to the second upper supporters 25 of the connecting brackets 20 by a screw or similar elements and/or techniques, respectively.

However, a single second link may be provided adjacent to the first link 30 in parallel, so that the single second link can be rotatably combined to one second upper supporter 25 and one second lower supporting part 55. Further, the pair of second links may be provided incorporated to each other similar to the first link 30, so that the incorporated second link can be rotatably combined to the pair of upper supporting parts 25 and the pair of second lower supporting parts 55.

The first spring 60 is interposed between the first link 30 and the first lower supporting part 53, and has resilience elastically biasing the first link 30 upward with respect to the base 50, where the first spring 60 forms a pair. Further, the first spring 60 includes a torsion spring, which is put on the first lower supporting part 53 and has a first end 61 coupled to a first spring supporting part (not shown) provided to the base bracket 51 and a second end 62 coupled to a first spring coupler 37 provided to the first link 30. However, a single first spring may be interposed between the first link 30 and either one of the first lower supporting parts 53.

The second spring 65 is interposed between the second link 40 and the second lower supporting part 55, and has resilience elastically biasing the second link 40 upward with respect to the base 50, where the second spring 65 forms a pair. Further, the second spring 65 includes a torsion spring, which is put on the second lower supporting part 55 and has a first end 66 coupled to a second spring supporting part (not shown) provided to the base bracket 51 and a second end 67 coupled to a second spring coupler 47 provided to the second link 40. However, the second spring may be singly interposed between the second link 40 and either of the second lower supporting parts 55.

According to an aspect of the present invention, the sum of resilience due to the first and second springs 60 and 65 is approximately equal to the weight of the monitor 10. Therefore, when the first and second links 30 and 40 are rotated relative to the base 50, the resilience of the first and second spring 60 and 65 offsets the weight of the monitor 10 to allow a user to easily rotate the first and second links 30 and 40.

Further, there is provided a link rotation restrictive part to restrict a rotation angle of at least one of the first and second links 30 and 40 relative to the base 50.

The link rotation restrictive part comprises a protrusion 58 protruding from the base bracket 51, and restricting the rotation angle of the first link 30 by contacting the upper surface of the first link 30. Further, the projection may restrict the rotation angle of the second link 40 by contacting the upper surface of the second link 40. Hence, the protrusion 58 restricts the upward rotation angle of the first and second links 30 and 40. Further, it should be appreciated that the rotation angle can be adjusted by changing the allowable position of the protrusion 58.

Thus, the height of the monitor 10 is adjusted by rotating the first and second links 30 and 40 relative to the base 50.

Here, the distance between rotating axes of the first and second lower supporting parts 53 and 55, on which the first and second links 30 and 40 are rotatably supported, respectively, should be greater than the distance between tilting axes of the first and second upper supporters 23 and 25. Accordingly when the distance between the rotating axes of the first and second lower supporting parts 53 and 55 are greater than the distance between the tilting axes of the first and second upper supporters 23 and 25, the first and second upper supporters 23 and 25 rotate backward and forward when the first and second links 30 and 40 are rotated upward and downward relative to the base 50. For example, when the first and second links 30 and 40 are rotated downward relative to the base 50, the height of the monitor 10 is lowered, rotating the upper part of the monitor 10 combined to the connecting bracket 20 backward. Hence, the tilting angle of the monitor 10 is automatically adjusted to allow a user to view the screen. According to an aspect of the invention, the distance between the rotating axes and the distance between the tiling axes are approximately in the ratio of 6:5.

Accordingly, the monitor apparatus 1 according to an aspect of the present invention operates as follows.

Figure 5A:
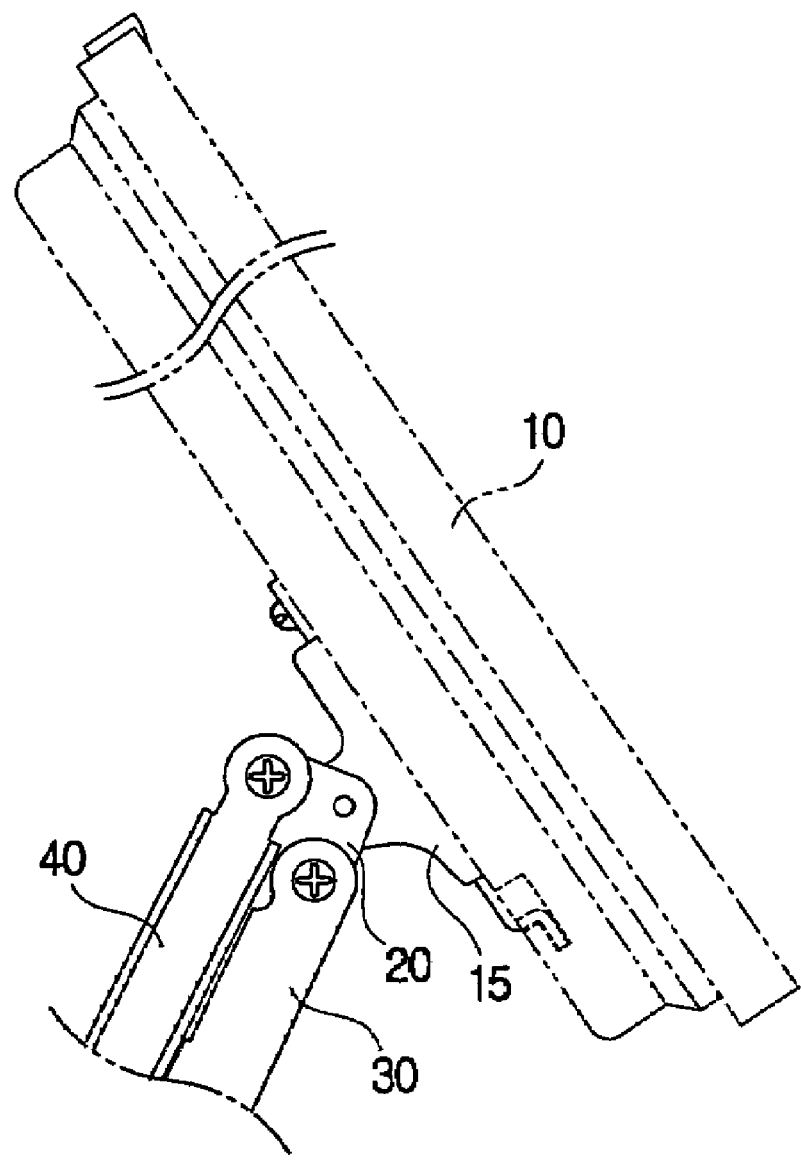
FIGS. 5A and 5B illustrate tilted positions of a monitor of the monitor apparatus with respect to a connecting bracket according to an aspect of the present invention.
Figure 5B:
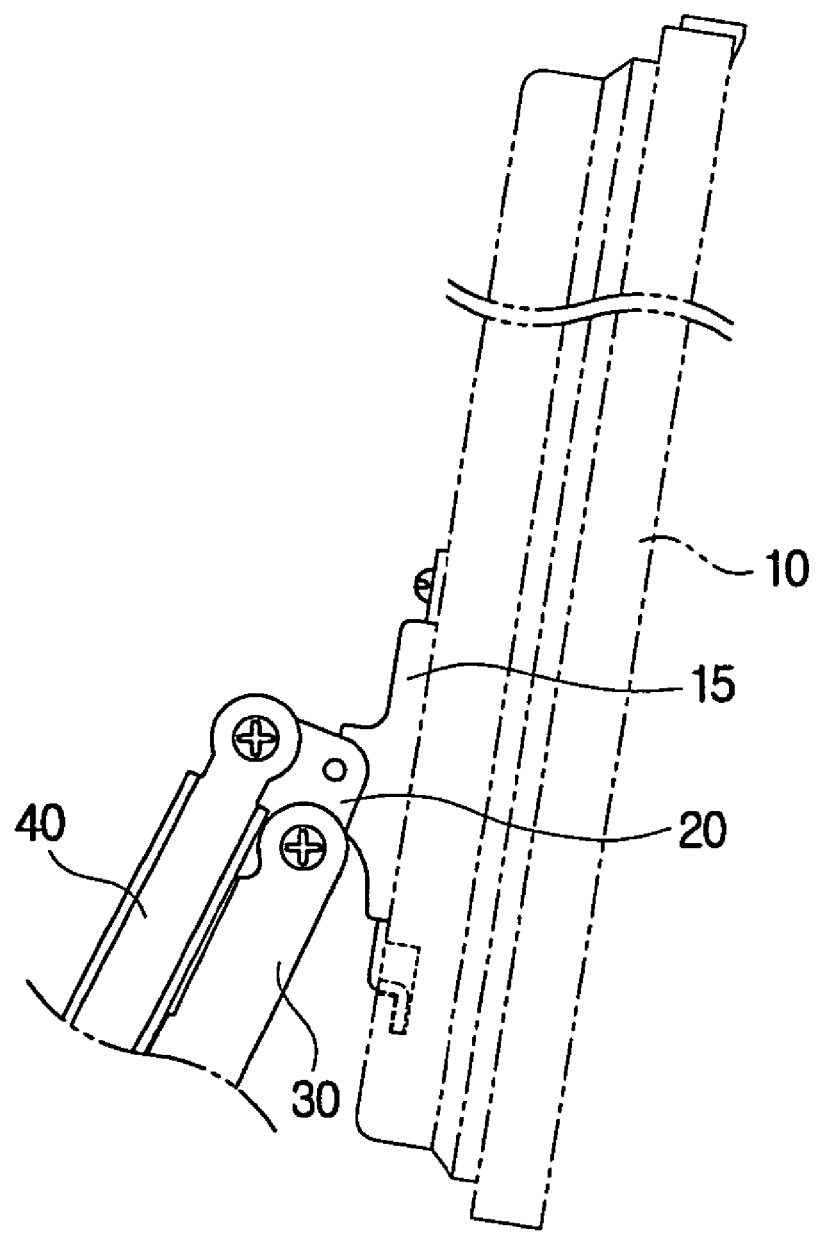
Figure 6A:
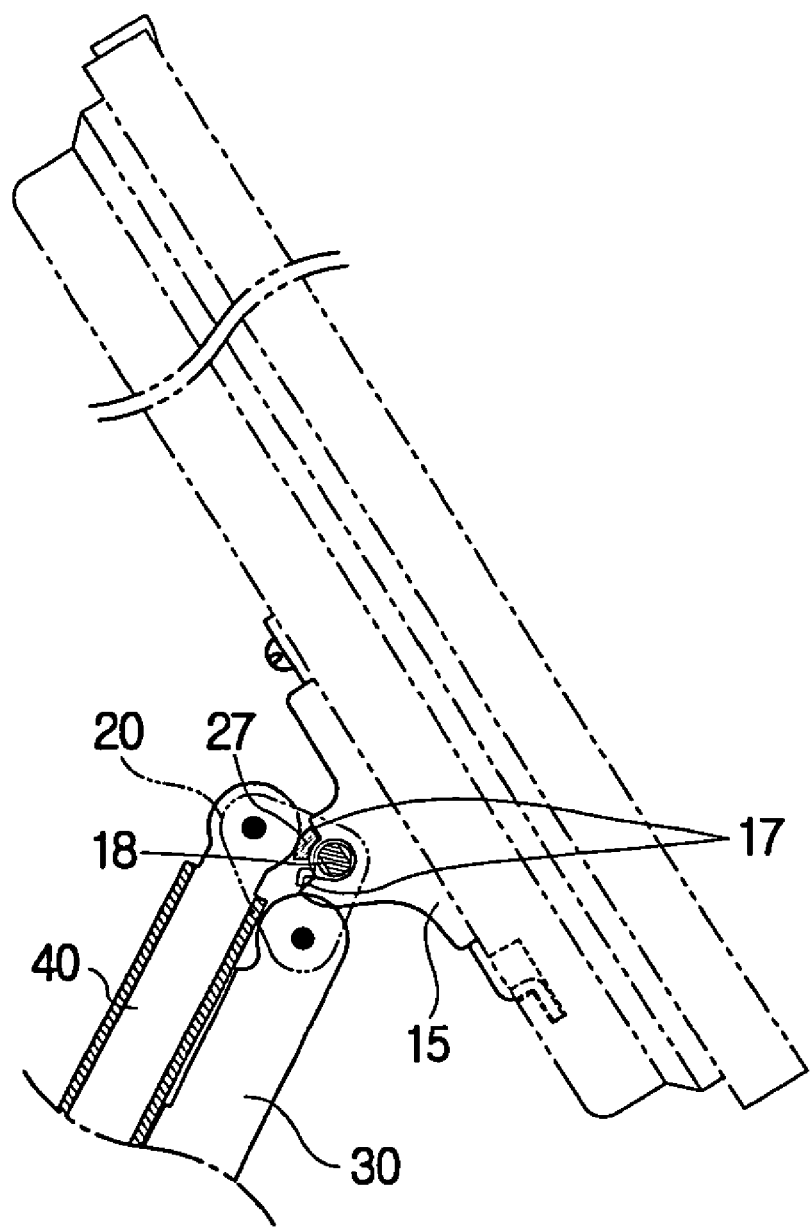
FIGS. 6A and 6B are side views of a monitor tilting restriction technique of the monitor apparatus of FIGS. 5A and 5B according to an aspect of the present invention.
Figure 6B:
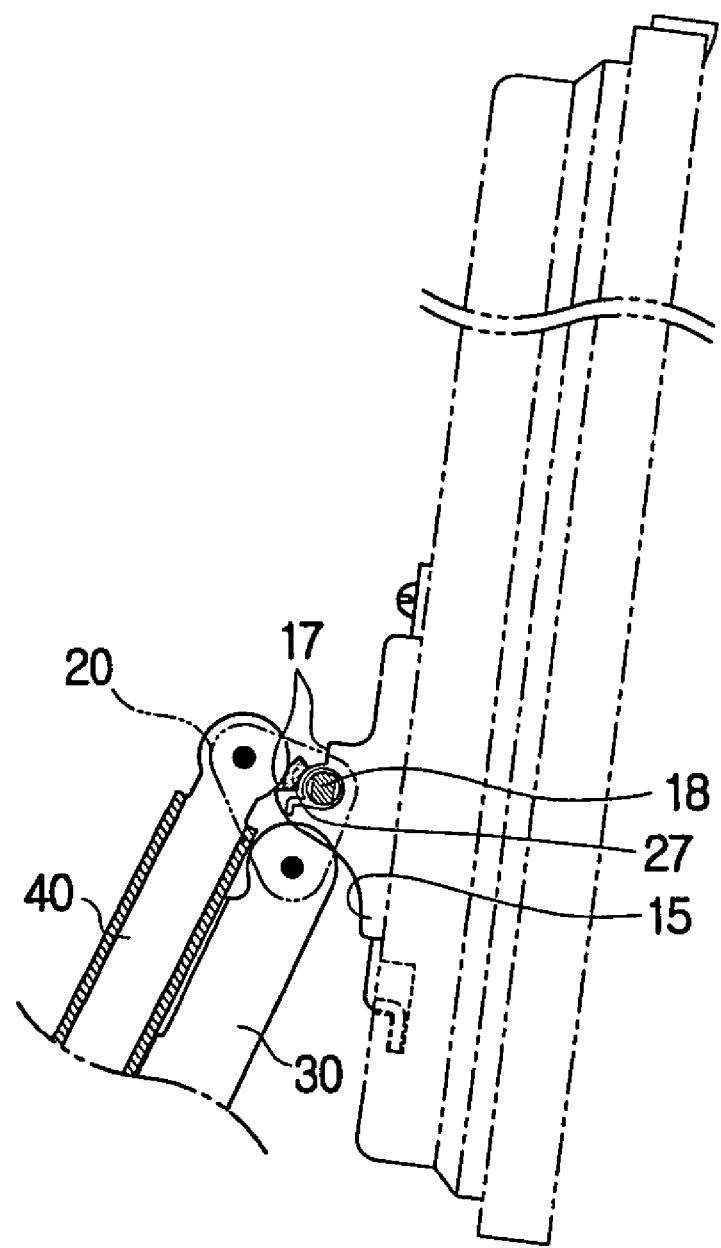

As shown in FIGS. 5A and 5B, when a user pushes the monitor 10 away from the user (FIG. 5A) or pulls the monitor 10 towards the user (FIG. 5B) with force to overcome the rotation resistance of the shaft 18 in order to tilt the monitor 10 relative to the connecting bracket 20 or the base 50, the monitor 10 rotates about the shaft 18 relative to the connecting bracket 20 to allow the user to adjust the tilting angle of the monitor 10. Here, the connecting bracket 20 rotates only when the first and second links 30 and 40 are rotated, and the connecting bracket 20 does not rotate relative to the base 50. Further, an allowable tilting angle of the monitor 10 is restricted to the mobility of the projection 27 within the stopping part 17. Herein, it should be appreciated that the allowable tilting angle of the monitor 10 can be adjusted by changing the shape of the stopping part 17 (refer to FIGS. 6A and 6B).

Figure 7A:
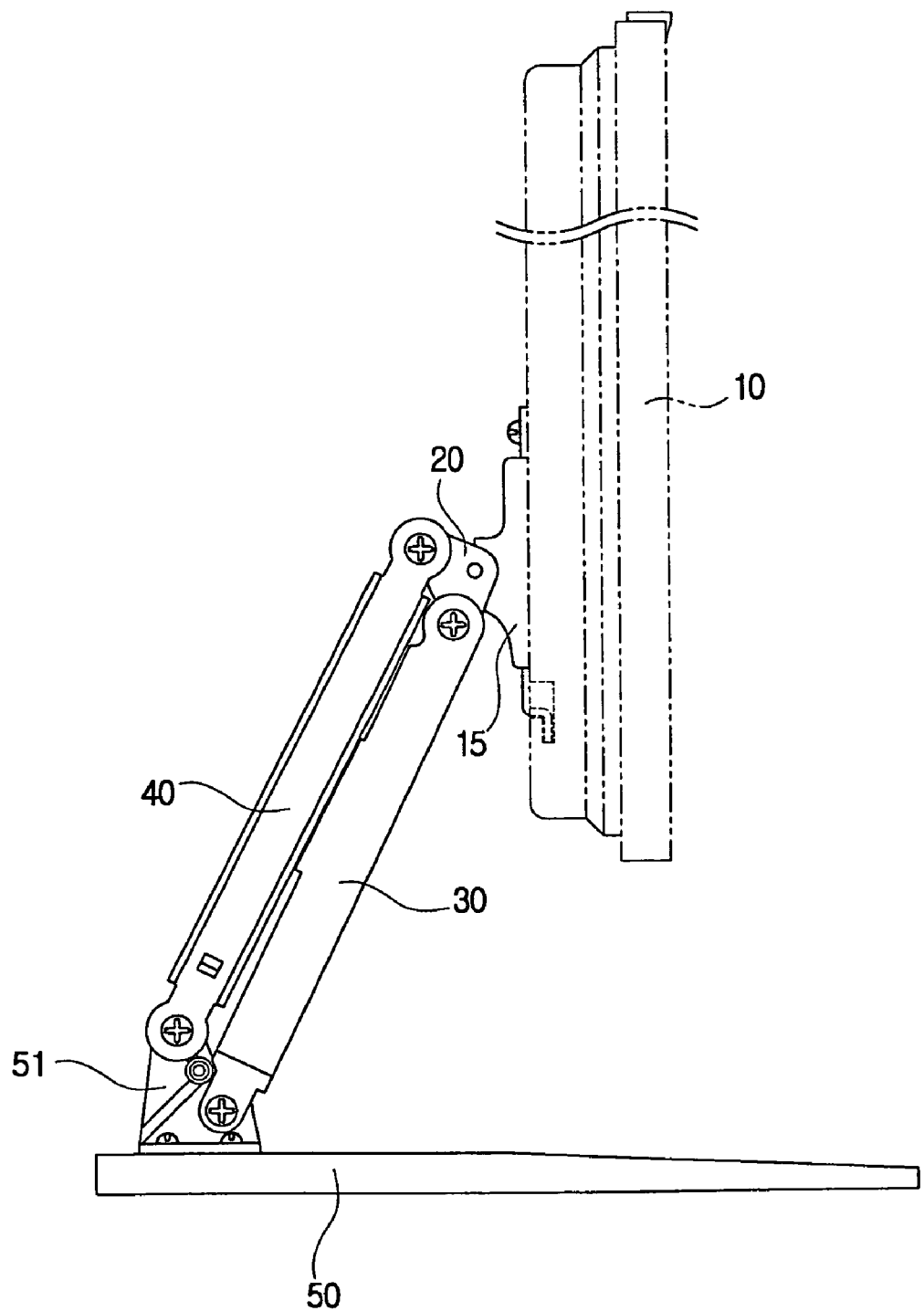
FIGS. 7A and 7B illustrate tilting of a link member with respect to a base of the monitor apparatus according to an aspect the present invention.
Figure 7B:
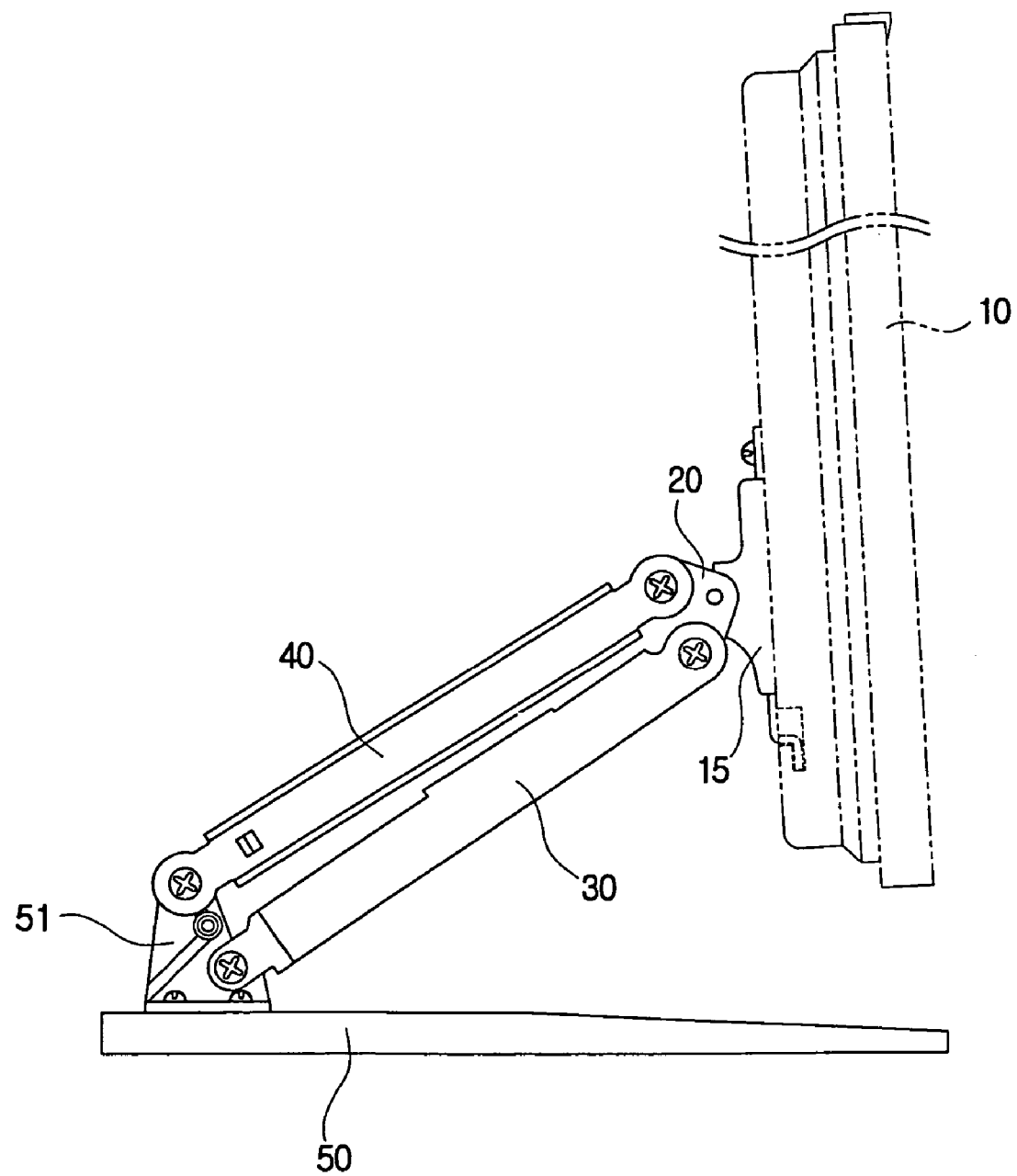

As shown in FIGS. 7A and 7B, when the first and second links 30 and 40 are rotated upward and downward relative to the base 50 to adjust the height of the monitor 10, a user can easily rotate the first and second links 30 and 40 because the resilience of the first and second spring 60 and 65 offsets the weight of the monitor 10. Here, because the distance between the rotating axes of the first and second lower supporting parts 53 and 55 are greater than the distance between the tilting axis of the first and second upper supporters 23 and 25, the connecting bracket 20 rotates backward and forward relative to the first and second links 30 and 40 when the first and second links 30 and 40 are rotated upward and downward relative to the base 50. For example, when the first and second links 30 and 40 are rotated downward relative to the base 50, the height of the monitor 10 is lowered, rotating the connecting bracket 20 backward relative to the first and second links 30 and 40. Consequently, the monitor 10 combined to the connecting bracket 20 is rotated backward. At this time, the monitor 10 rotates incorporatively with the connecting bracket 20 because of the rotation resistance due to the shaft 18 combining the monitor 10 with the connecting bracket 20. Hence, the tilting angle of the monitor 10 is automatically adjusted to allow a user to view the screen. Further, an allowable upward rotation angle of the first and second links 30 and 40 is restricted by the protrusion 58. However, it should be appreciated that the allowable rotation angle can be variously adjusted by changing the position of the protrusion 58.

As described above, according to the monitor apparatus 1, both the height and the tilting angle of the monitor 10 can be adjusted as desired. Also, the height of the monitor 10 is adjusted while keeping the tilting angle thereof within an angle suitable for a user to view the screen.

According to an aspect of the present invention, the second spring 65 is removably coupled to the second lower supporting part 55 and the second link 40. Because the sum of resilience due to the first and second springs 60 and 65 is approximately equal to the weight of the monitor 10, according to an aspect of the invention, at least one of the first and second springs 60 and 65 is removably provided in order to correspond to various weights of monitors.

For example, the first spring 60 has a resilience corresponding to the weight of a 17-inch monitor, and the second spring 65 has the resilience corresponding to a weight difference between a 19-inch monitor and the 17-inch monitor.

Figure 8:
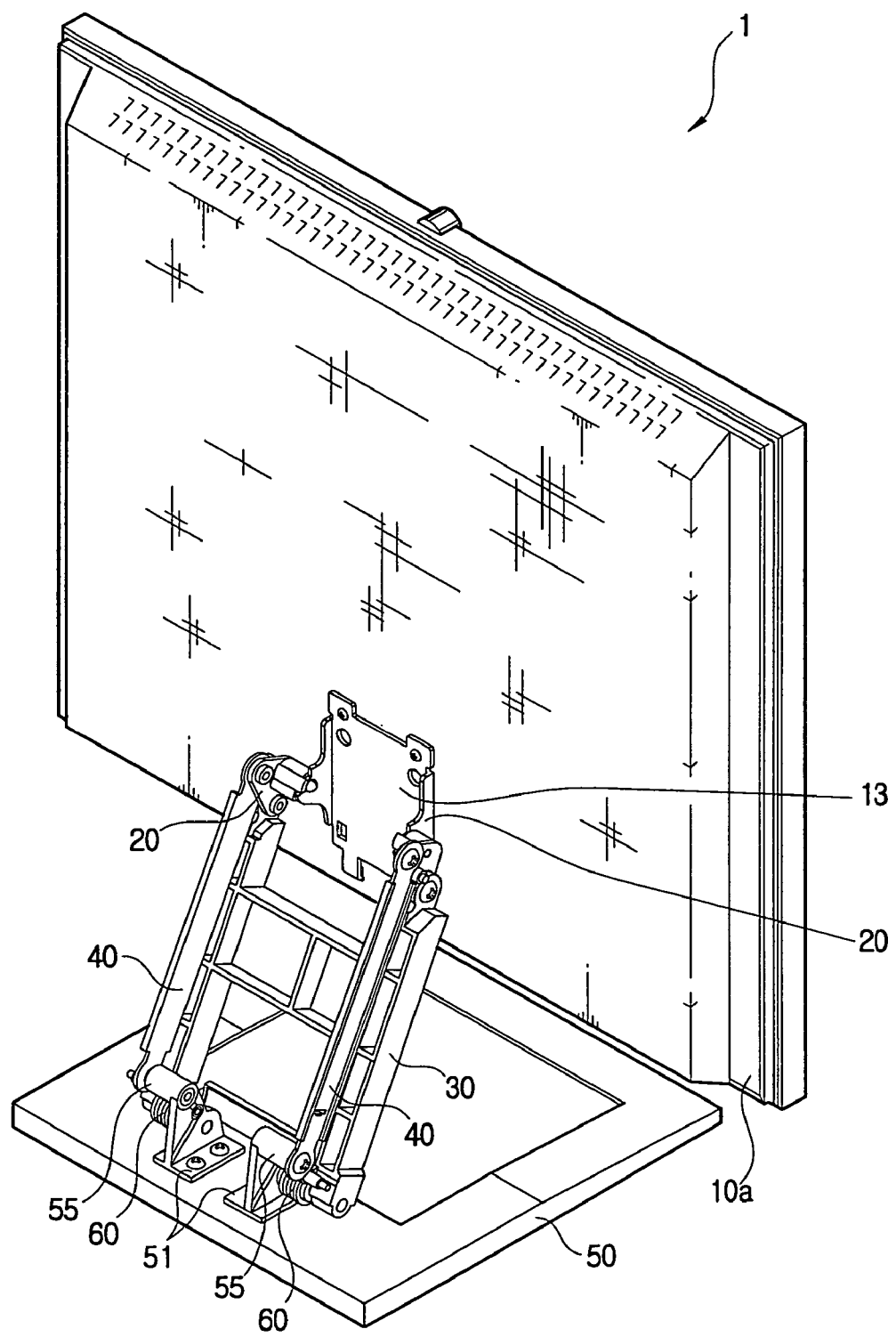
FIG. 8 is a rear perspective view of the monitor apparatus with a relatively light monitor.

When the monitor apparatus comprises a 19-inch monitor, both the first and second springs 60 and 65 are provided to the monitor apparatus 1 (refer to FIG. 3). But when a 17-inch monitor, which is lighter than the 19-inch monitor, is used, only the first spring 60 is provided to the monitor apparatus 1 without the second spring 65 (refer to FIG. 8). Hence, monitors with different sizes can be selectively mounted on the monitor apparatus 1.

Thus, the monitor apparatus according to an aspect of the present invention can accommodate various monitor sizes because of the first and second springs 60 and 65 having a resilience corresponding to the various weights of the monitor.

As described above, an aspect of the present invention provides a monitor apparatus where a monitor can be adjusted in both height and a tilting angle as desired, and the height of the monitor is adjusted while keeping the tilting angle thereof in an angle suitable for a user to view at the screen.

Further, an aspect of the present invention provides a monitor apparatus accommodating various sizes of a monitor via using a removable spring member.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A monitor apparatus including a monitor, and a base to support the monitor, comprising:
   a first link provided between the monitor and the base;
   a second link provided between the monitor and the base, and adjacent to the first link;
   a base bracket, combined to the base, the base bracket having first and second lower supporting parts to rotatably support lower parts of the first and second links, respectively;
   a connecting bracket rotatably combined to the monitor, the connecting bracket having first and second upper supporters to be rotatably connected with upper parts of the first and second links, respectively, and a monitor coupler spaced from the first and second upper supporters, and rotatably combined to the monitor, wherein none of the first and second upper supporters and the monitor coupler are in axial alignment with each other and the monitor is tilted with respect to the connecting bracket to adjust a tilting angle of the monitor; and
   a first spring interposed between the first link and the first lower supporting part, to elastically bias the first link upward with respect to the base,
   wherein the first spring comprises a torsion spring having a first end coupled to the first lower supporting part, and a second end coupled to the first link.

2. The monitor apparatus according to claim 1, further comprising:
   a link rotation restrictive part to restrict a rotation angle of at least one of the first and second links relative to the base.

3. The monitor apparatus according to claim 2, wherein the link rotation restrictive part further comprises:
   a protrusion protruding from the base bracket to restrict the rotation angle of at least one of the first and second links by making contact with an upper surface of at least one of the first and second links.

4. The monitor apparatus according to claim 1, further comprising:
   a monitor bracket combined to the monitor, and rotatably combined to the connecting bracket.

5. The monitor apparatus according to claim 4, further comprising:
   a monitor tilting restrictive part to restrict a tilting angle of the monitor bracket relative to the connecting bracket.

6. The monitor apparatus according to claim 5, wherein the monitor tilting restrictive part further comprises:
   a projection protruding from the monitor coupler towards the connecting supporter of the monitor bracket; and
   a stopping part formed by cutting an arc of the connecting supporter provided in the monitor bracket.

7. The monitor apparatus according to claim 1, further comprising a second spring,
   wherein the second spring comprises a torsion spring having a first end removably coupled to the second lower supporting part, and a second end removably coupled to the second link.

8. The monitor apparatus according to claim 1, further comprising a second spring interposed between the second link and the second lower supporting part to elastically bias the second link upward with respect to the base,
   wherein the distance between rotating axes of the first and second lower supporting parts that rotatably support the first and second links, respectively, is greater than the distance between tilting axes of the first and second upper supporters.

9. A monitor apparatus including a monitor and a base, comprising:
   a first link extending from the monitor to the base;
   a second link extending from the monitor to the base provided adjacent to the first link;
   a base bracket combined to the base to support the first and second links, the base bracket comprising a first lower supporting part to rotatably support a lower part of the first link and a second lower supporting part to rotatably support a lower part of the second link;
   a connecting bracket rotatably combined to the monitor, the connecting bracket comprising a first upper supporter to rotatably support an upper part of the first link and a second upper supporter to rotatably support an upper part of the second link;
   a monitor bracket combined to the monitor, and rotatably combined to the connecting bracket; and
   a rotation restrictive part to restrict at least one of a tilting angle of the monitor bracket and a rotation angle of at least one of the first and second angle with respect to the base,
   wherein the connecting bracket includes a monitor coupler provided spaced from the first and second upper supporter, and rotatably combined to the monitor, and
   none of the first and second upper supporters and the monitor coupler are in axial alignment with each other.

10. The monitor apparatus according to claim 9, wherein the monitor bracket further comprises:
    a connecting supporter protruding towards the connecting bracket.

11. The monitor apparatus according to claim 10, wherein the connecting supporter further comprises:
    a through hole via which the monitor coupler is rotatably combined to the connecting supporter.

12. The monitor apparatus according to claim 11, wherein the distance between rotating axes of the first and second lower supporting parts that rotatably support the first and second links, respectively, is greater than the distance between tilting axes of the first and second upper supporters.

13. The monitor apparatus according to claim 11, wherein the connecting bracket rotates relative to the first and second links when the first and second links are rotated relative to the base.

14. The monitor apparatus according to claim 11, wherein the through hole has a non-circular shape.

15. The monitor apparatus according to claim 14, wherein the first and second upper supporters rotate when the first and second links are rotated relative to the base.

16. The monitor apparatus according to claim 9, wherein the monitor coupler further comprises:
a protruding part protruding from the connecting bracket, and formed with a shaft holder in which a shaft is accommodated.

17. The monitor apparatus according to claim 9, wherein the monitor coupler is not aligned with the first and second upper supporters.

18. The monitor apparatus according to claim 9, wherein the connecting bracket does not rotate relative to the base when the first and second links are rotated.

19. The monitor apparatus according to claim 9, wherein height of the monitor is adjusted by rotating the first and second links relative to the base.

20. The monitor apparatus according to claim 9, further comprising:
a link rotation restrictive part to restrict a rotation angle of at least one of the first and second links relative to the base.

21. The monitor apparatus according to claim 9, further comprising a first spring interposed between the first link and the base bracket.

22. The monitor apparatus according to claim 9, further comprising a second spring interposed between the second link and the base bracket.

23. The monitor apparatus according to claim 9, wherein the rotation restrictive part further comprises:
a monitor tilting restrictive part to restrict a titling angle of the monitor bracket relative to the connecting bracket.

24. The monitor apparatus according to claim 9, wherein the monitor tilting restrictive part further comprises:
a projection protruding from the monitor coupler towards the connecting supporter of the monitor bracket.

25. The monitor apparatus according to claim 9, wherein a predetermined distance is provided between the first and second upper supporters of the connecting bracket.

26. The monitor apparatus according to claim 9, wherein the first link further comprises:
a pair of first lower couplers to rotatably combine with the base bracket; and
a pair of first upper couplers to rotatably combine with the connecting part.

27. The monitor apparatus according to claim 9, wherein the second link further comprises:
a second lower coupler to rotatably combine with the base bracket; and
a second upper coupler to rotatably combine with the connecting part.

28. The monitor apparatus according to claim 9, wherein the sum of resilience due to the first and second springs is approximately equal to a weight of the monitor.

29. A monitor apparatus including a monitor, and a base to support the monitor, comprising:
a first link provided between the monitor and the base;
a second link provided between the monitor and the base, and adjacent to the first link;
a base bracket, combined to the base, the base bracket having first and second lower supporting parts to rotatably support lower parts of the first and second links, respectively;
a connecting bracket rotatably combined to the monitor, the connecting bracket having first and second upper supporters to be rotatably connected with upper parts of the first and second links, respectively, wherein the monitor is tilted with respect to the connecting bracket to adjust a tilting angle of the monitor; and
a rotation restrictive part to restrict at least one of a tilting angle of the monitor bracket and a rotation angle of at least one of the first and second angle with respect to the base,
wherein the connecting bracket comprises a shaft fitted to a spring to prevent the shaft rotation with respect to the connecting bracket, and
none of the first and second upper supporters and the shaft are in axial alignment with each other.

30. The monitor apparatus according to claim 29, wherein the rotation restrictive part comprises:
a monitor tilting restrictive part to restrict a tilting angle of the monitor bracket relative to the connecting bracket.

31. The monitor apparatus according to claim 29, wherein the spring comprises a flat spring.

32. A display apparatus comprising:
a screen body;
a base member supporting the screen body;
a first link member provided between the screen body and the base member, the first link member being rotatable with respect to the screen body at an upper end and being rotatable with respect to the base member at a lower end;
a second link member provided between the screen body and the base member, the second link member being rotatable with respect to the screen body at an upper end and being rotatable with respect to the base member at a lower end;
a base bracket coupling the base member with the lower end of the first link member and the lower end of the second link member; and
a connecting bracket coupling the screen body with the upper end of the first link member and the upper end of the second link member,
wherein the first link member and the second link member have a different axis of rotation at the upper ends and the lower ends,
the screen body is rotatable with respect to the connecting bracket, and
the upper ends of the first link member and the second link member and the screen body have axes of rotation that are parallel and apart from each other.

33. The display apparatus according to claim 32, wherein the distance between the axes of rotation of the lower ends of the first and second link members is greater than the distance between the axes of rotation of the upper ends of the first and second link member.

34. The display apparatus according to claim 32, wherein at least one of the first link member and the second link member has an H-shape.

* * * * *

UNITED STATES PATENT AND TRADEMARK OFFICE
CERTIFICATE OF CORRECTION

PATENT NO.         : 7,497,408 B2                                                          Page 1 of 1
APPLICATION NO.    : 10/812011
DATED              : March 3, 2009
INVENTOR(S)        : Jeong-su Lim et al.

It is certified that error appears in the above-identified patent and that said Letters Patent is hereby corrected as shown below:

On the title page, item [56]: Column 2 (Other Publications), Line 3, change "submitted." to --submitted on March 30, 2004.--.

Signed and Sealed this

Sixteenth Day of June, 2009

JOHN DOLL
*Acting Director of the United States Patent and Trademark Office*